US006385496B1

United States Patent
Irwin et al.

(10) Patent No.: US 6,385,496 B1
(45) Date of Patent: May 7, 2002

(54) INDIRECT REFERENCING IN PROCESS CONTROL ROUTINES

(75) Inventors: William G. Irwin; Robert B. Havekost, both of Austin; Dennis L. Stevenson, Round Rock; David L. Deitz, Austin, all of TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/267,431

(22) Filed: Mar. 12, 1999

(51) Int. Cl.$^7$ .............................................. G05B 19/42
(52) U.S. Cl. ...................... 700/87; 700/266; 707/104.1; 709/331
(58) Field of Search ........................... 700/2, 9, 17, 86, 700/87, 89, 266; 717/5, 10; 707/103, 104.1, 100; 709/331, 332; 703/4, 6, 13

(56) References Cited

U.S. PATENT DOCUMENTS

| | | | |
|---|---|---|---|
| 4,908,792 A | 3/1990 | Przybyla et al. | 364/900 |
| 5,469,361 A | 11/1995 | Moyne | 364/468 |
| 5,768,119 A | 6/1998 | Havekost et al. | 364/133 |
| 5,801,942 A | 9/1998 | Nixon et al. | 364/188 |
| 5,828,851 A | 10/1998 | Nixon et al. | 395/285 |
| 5,838,563 A | 11/1998 | Dove et al. | 364/188 |
| 5,950,006 A | * 9/1999 | Crater et al. | 717/5 |

FOREIGN PATENT DOCUMENTS

| | | |
|---|---|---|
| GB | 1571218 | 7/1980 |
| WO | WO 97/37301 | 9/1997 |
| WO | WO 98/13737 A | 2/1998 |

OTHER PUBLICATIONS

Copy of Search Report Issued by United Kingdom Patent Office dated Apr. 25, 2000.

Peter Duffett–Smith, "Astronomy With Your Personal Computer," Second Edition, 1990, ISBN 0521 38955 X, pp. 1–6, plus README.DOC and batch program GWB.BAT from the accompanying program disc.

Copies of two Search Reports Issued by British Patent Office regarding searches dated Oct. 16, 2000.

(List continued on next page.)

*Primary Examiner*—William Grant
*Assistant Examiner*—Steven R. Garland
(74) *Attorney, Agent, or Firm*—Marshall, Gerstein & Borun

(57) ABSTRACT

A generic process control routine for a process control system is written to include alias names and dynamic reference parameters. Before execution of a process control function on a particular unit of the process control system, an instance of the generic routine is created, in which the alias names are replaced by parameters defined in an alias resolution table for the particular unit. The controller then executes the instantiated version of the generic routine to control operation of the unit. The generic routine can have multiple algorithms associated therewith, wherein each of the algorithms is designed to control different units having somewhat different hardware, even though these different units perform essentially the same function within the process control system. The generic routine may also be used with multiple classes of hardware that perform different functions within the process control system. The dynamic reference parameters of the generic process control routine enable a field to be specified at or during run-time and include a reference attribute that stores a path or tag to the referenced field, a connection attribute that identifies whether an actual connection to the field specified by the reference attribute can be made, attributes that enable reading of and/or writing to the field specified by the reference attribute as a string or as a numerical value and attributes that enable status information of the referenced field to be accessed.

28 Claims, 3 Drawing Sheets

OTHER PUBLICATIONS

Copy of Search Report Issued by United Kingdom Patent Office regarding search dated Oct. 17, 2000.

DeltaV™ System Overview Brochure, Fisher–Rosemount Systems, 32 pages (1998).

DeltaV™ Product Data Sheets, DeltaV Control Network, Workstation Specifications, DeltaV Controller, DeltaV Power Supplies, DeltaV I/O Subsystem, DeltaV Diagnostics, DeltaV Event Chronicle, Delta V Excel Add–in, Delta V Real–Time Data Server, 56 pages (1996).

Fisher–Rosemount Systems Brochure, CE12.0:CL6640: vol. 1, 5 pages (Nov. 1998).

* cited by examiner

INDIRECT REFERENCING IN PROCESS CONTROL ROUTINES

FIELD OF THE INVENTION

The present invention relates generally to process control networks and, more specifically, to the use of indirect referencing in process control routines to enable advanced process control.

DESCRIPTION OF THE RELATED ART

Process control networks, such as those used in chemical, petroleum or other processes, generally include a centralized process controller communicatively coupled to one or more field devices which may be, for example, valve positioners, switches, sensors (such as temperature, pressure and flow rate sensors), etc. These field devices may perform physical control functions within the process (such as opening or closing a valve), may take measurements within the process for use in controlling the operation of the process or may perform any other desired function within the process. Process controllers have historically been connected to field devices via one or more analog signal lines or buses which may carry, for example, 4–20 mA (milliamp) signals to and from the field devices. More recently, however, the process control industry has developed a number of standard, open, digital or combined digital and analog communication protocols such as the FOUNDATION™ FIELDBUS (hereinafter "Fieldbus"), HART®, PROFIBUS®, WORLDFIP®, Device-Net® and CAN protocols which can be used to implement communications between a controller and field devices. Generally speaking, the process controller receives signals indicative of measurements made by one or more field devices and/or other information pertaining to the field devices, uses this information to implement a typically complex control routine and generates control signals which are sent via the signal lines or buses to the field devices to thereby control the operation of the process.

Certain types of process control networks, such as those used in batch processes, typically include multiple sets of replicated equipment designed to have the same or similar equipment which performs essentially the same function within the processes. Thus, for example, a cookie manufacturing plant may have multiple sets of mixing equipment, multiple sets of baking equipment, and multiple sets of packaging equipment, with all of the individual mixers being capable of operating in parallel and of being connected to operate in series with any of the baking equipment and any of packaging equipment. In such a system, it is desirable to be able to use the same control algorithm or routine to control the operation of any particular set of replicated equipment to thereby reduce the number of control routines that must be created and stored within the controller. However, these control algorithms must be written so that, when executed, they specify the equipment of a particular unit being used at the time.

In some prior art systems, a generalized control routine using alias names (i.e., unspecified variables) to designate the specific equipment that varied from replicated unit to replicated unit was created in a workstation. To enable a system controller to perform the generalized control routine on a particular unit, the generalized program was instantiated using an alias resolution table created for a particular unit. Such an alias resolution table included a definition for each alias name used in the generalized control routine and was used to create an executable instance of the generalized control routine by substituting the values in the alias resolution table of the particular unit for the alias names in the control routine. This instantiated control routine was then downloaded into and stored in the controller and, thereafter, was used during run-time to perform a control operation (or phase) on the particular unit. However, using this system, the controller had to store a separate instantiated (resolved) control routine for each of the different ones of the replicated units, thereby requiring a lot of memory space within the controller, especially if the controller was used to control a large number of similar units and was being used to perform a lot of different operations or phases on each unit (as separate instantiated control routines were required for each phase for each unit).

In another prior art system, the generalized control routine was stored in the controller and was used during run-time to perform the programed operation or phase on any of the replicated units to which it was applied. In this case, the alias names were resolved on the fly during run-time using the alias resolution table for the particular unit being controlled. However, in this configuration, if a change was to be made to the generalized control routine that was currently being run by the controller, the run of that routine had to be aborted to enable a new generalized control routine to be downloaded into the controller. This resulted in the loss of the materials, time, etc. associated with the aborted run of the process.

Furthermore, neither of these known systems enabled a single generic process control routine with alias names to be applied across multiple or different classes of units or equipment. In fact, in these prior art systems, a control routine for a phase was limited to use with one unit class, i.e., one specific type of hardware unit, such as reactors, or mixers, etc. As a result, a first generic process control routine had to be created and stored to, for example, fill a reactor vessel while a second generic process control routine had to be created and stored to fill mixing tanks and a third one had to be created and stored to fill feeder tanks, resulting in the creation of many different generic control routines for performing essentially the same function on different types of hardware.

Likewise, none of these prior art systems enabled the generic control routine to account for differences between the equipment associated with different modules of a particular type of hardware unit. For example, if a first reactor unit had an electrical heating element associated therewith and a second reactor unit had a steam heating element associated therewith, a different generic control routine had to be developed for heating each of these reactor units to account for the differences in the control of the electrical heater and the steam heater, even though the process only required heating to be performed, with the type of heating being irrelevant. This problem generally occurs when additional units or modules (such as reactor modules) are added to a process control system at various times and, because of cost, new advances in hardware, etc., the newly added modules, while being designed to perform essentially the same function as the existing modules, have slightly different equipment associated therewith.

Still further, these prior art systems had no easy method of specifying a parameter to be identified during run-time of the process control routine for any phase of a process. In fact, in most prior art systems having indirect referencing, the alias resolution table was used to resolve alias names when the process control routine was configured or put into machine readable code, which was before run-time. To enable a variable to be changed or specified during run-time, one prior art system provided an addressing scheme, such as an address array, into which references or pointers could be, placed during run-time so that, when the control program reached an instruction referencing one of the addresses in the array, the program would go to the device or position referred to by the contents of the specified address. However, there was no way to tell if the contents of the referenced address pointed to a valid device or to a proper place within the control routine during run-time. If the pointer was invalid, the program would be suspended and not continue, which caused production to stop. Still further, this addressing scheme was complex and hard to use properly because it required a detailed knowledge of the address array holding the pointers and knowledge as to which address of the array was being used by the control routine at which times. Thus, it required a lot of work on the part of the designer and the user to assure that a correct pointer was stored in the correct address at the correct time to prevent the control routine from suspending during run-time.

SUMMARY OF THE INVENTION

A process control system includes one or more process control routines that enable indirect referencing using alias names and/or dynamic reference parameters. A generic process control routine is written to include alias names and this generic process control routine is stored in a controller that controls a process having, for example, replicated equipment (replicated units) therein. Before execution of a process control function on a particular unit, an instance of the generic routine that controls that function is created, in which the alias names in the generic control routine are replaced by parameters defined in an alias resolution table for the particular unit. The controller then executes the instantiated version of the generic routine to control operation of the unit. This reduces the memory requirements of the controller because it allows the controller to store only the generic routine and the instantiated versions of that routine that are currently running, instead of storing an instantiated version of the generic routine for each and every unit at all times. Furthermore, this enables the generic control routine to be changed while an instance thereof is executing without causing the executing routine to abort.

If desired, the generic program can have multiple algorithms associated therewith, wherein each of the different algorithms is designed to control different units having somewhat different hardware, even though these different units perform essentially the same function within the process control system. When an instantiated version of the generic program is created, the controller determines which of the multiple algorithms of the generic routine is to be used based on a stored indication identifying the hardware configuration of the particular unit for which the instantiated control routine is being created. The system also enables a control routine to be created for and applied to multiple unit classes or different types of hardware used to perform different functions within the process control system. In this case, a configuration routine may assure that an alias definition exists for each alias name in every alias resolution table associated with the different classes of units to which the generic process control routine is to be applied. This enables fewer generic control routines to be written and stored in the controller because a single generic control routine may be written and used to perform a particular function on different types of equipment used for different purposes within the process control system.

Moreover, the process control routine may use one or more dynamic reference parameters to enable a field, device, parameter, etc. to be specified after the instantiated executable program has been created, i.e., to enable a field to be referenced dynamically at or during run-time. The dynamic reference parameter has multiple attributes including, for example, a reference attribute that stores a pointer, a path or a tag to the referenced device, field, parameter, etc. and a connection attribute that identifies whether an actual connection to the field specified by the reference attribute can be made, e.g., whether the reference attribute defines a valid field within the process control system configuration. The dynamic reference parameter may also include attributes that enable reading of and/or writing to the field specified by the reference attribute as a string or as a numerical value. Still further, the dynamic reference parameter may include one or more attributes that allow a read of one or more status values associated with the field specified by the reference attribute including, for example, the status of that field and the status of the last write to that field.

DESCRIPTION OF THE PREFERRED EMBODIMENTS

Figure 1:
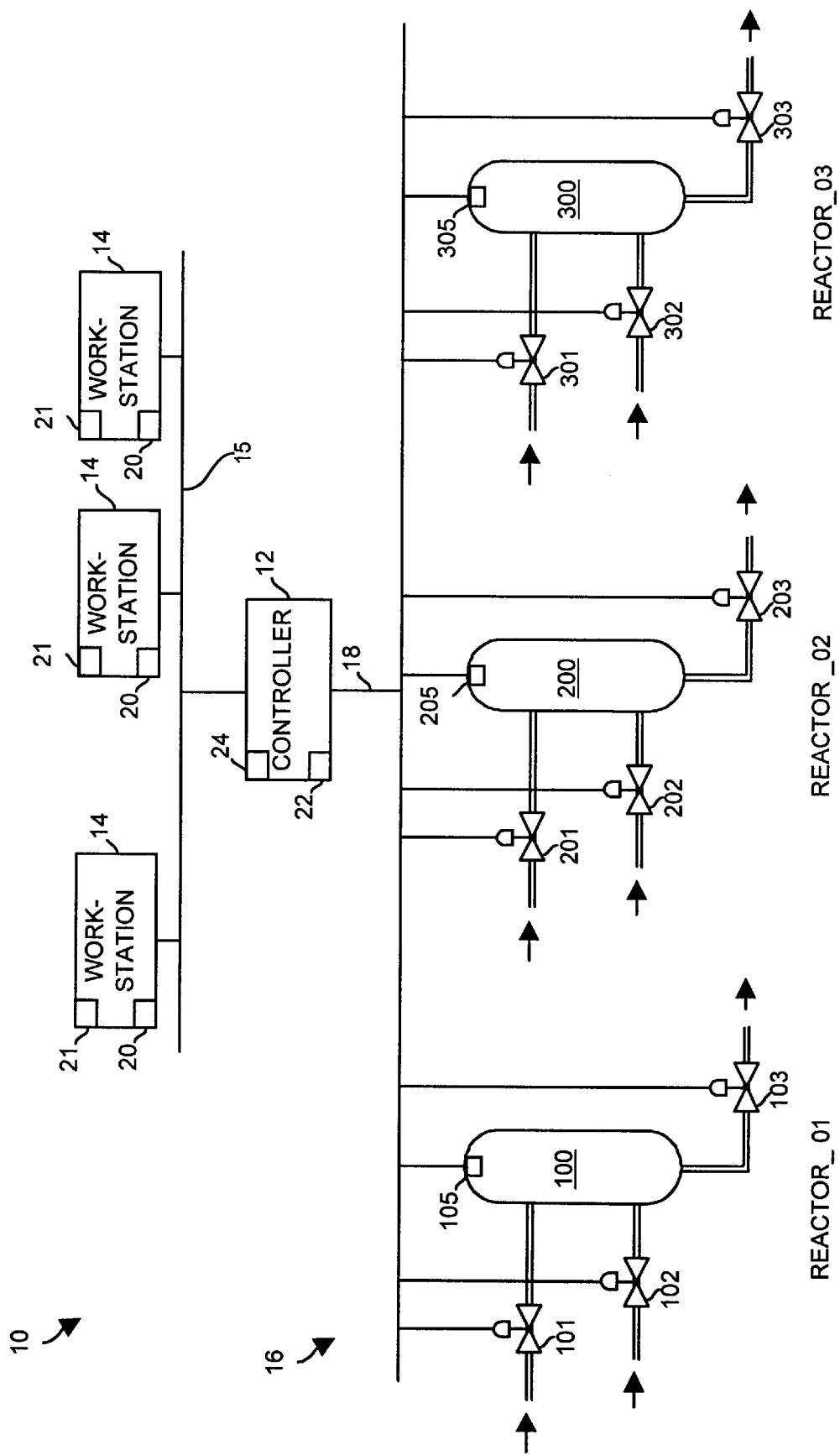
FIG. 1 is a partial block diagram, partial schematic diagram of a process control network that uses one or more control routines having alias names and/or dynamic reference parameters to perform control of process equipment.

Referring now to FIG. 1, a process control network 10 includes a process controller 12 coupled to numerous workstations 14 via an ethernet connection 15. The controller 12 is also coupled to devices or equipment within a process (generally designated by the reference numeral 16) via a set of communication lines or a bus 18. The controller 12, which may be by way of example only, the Delta™ controller sold by Fisher-Rosemont Systems, Inc., is capable of communicating with control elements, such as field devices and function blocks within field devices distributed throughout the process 16 to perform one or more process control routines to thereby implement desired control of the process 16. The workstations 14 (which may be, for example, personal computers) may be used by one or more engineers or users to design process control routines to be executed by the controller 12, to communicate with the controller 12 so as to download such process control routines and to receive and display information pertaining to the process 16 during operation of the process 16. Each of the workstations 14 includes a memory 20 for storing applications, such as configuration design applications, and for storing data, such as configuration data pertaining to the configuration of the process 16. Each of the workstations 14 also includes a processor 21 that executes the applications to enable a user to design process control routines and to download these process control routines to the controller 12. Likewise, the controller 12 includes a memory 22 for storing configuration data and process control routines to be used to control the process 16 and includes a processor 24 that executes the process control routines to implement a process control strategy. If the controller 12 is a Delta V controller, it may provide a graphical depiction of the process control routines within the controller 12 to a user via one of the workstations 14 illustrating the control elements within the process control routine and the manner in which these control elements are configured to provide control of the process 16.

In the process control network 10 illustrated in FIG. 1, the controller 12 is communicatively connected via the bus 18 to three sets of similarly configured reactors referred to herein as Reactor_01, Reactor_02 and Reactor_03. Reactor_01 includes a reactor vessel 100, two input valves 101 and 102 connected so as to control fluid inlet lines providing fluid into the reactor vessel 100 and an output valve 103 connected so as to control fluid flow out of the reactor vessel 100 via an outlet fluid line. A device 105, which can be a sensor, such as a temperature sensor, a pressure sensor, a fluid level meter etc. or some other equipment such as an electrical heater or a steam heater, is disposed in or near the reactor vessel 100. Similarly, Reactor_02 includes a reactor vessel 200, two input valves 201 and 202, an output valve 203 and a device 205 while Reactor_03 includes a reactor vessel 300, two input valves 301 and 302, an output valve 303 and a device 305. As illustrated in FIG. 1, the controller 12 is communicatively coupled to the valves 101–103, 201–203 and 301–303 and to the devices 105, 205 and 305 via the bus 18 to control the operation of these elements to perform one or more operations with respect to the reactor units. Such operations may include, for example, filling the reactor vessels, heating the material within the reactor vessels, dumping the reactor vessels, cleaning the reactor vessels, etc.

The valves, sensors and other equipment illustrated in FIG. 1 may be any desired kind or type of equipment including, for example, Fieldbus devices, standard 4–20 ma devices, HART devices, etc. and may communicate with the controller 12 using any known or desired communication protocol such as the Fieldbus protocol, the HART protocol, the 4–20 ma analog protocol, etc. Still further, other types of devices may be connected to and be controlled by the controller 12 in accordance with the principles of the present invention. Also, other controllers may be connected to the controller 12 and to the workstations 14 via the ethernet communication line 15 to control other devices or areas associated with the process 16 and the operation of such additional controllers may be coordinated with the operation of the controller 12 illustrated in FIG. 1 in any desired manner.

Generally speaking, the process control system of FIG. 1 may be used to implement batch processes in which, for example, one of the workstations 14 or the controller 12 executes a batch executive routine, which is a high level control routine that directs the operation of one or more of the reactor units (as well as other equipment) to perform a series of different steps (commonly referred to as phases) needed to produce a product, such as a food product, a drug, etc. To implement different phases, the batch executive routine uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run. Each of the steps defines a phase of the batch run and the batch executive routine within the controller 12 will execute a different control algorithm for each one of these phases. Of course, the specific materials, amounts of materials, heating temperatures and times, etc. may be different for different recipes and, consequently, these parameters may change from batch run to batch run depending on the product being manufactured or produced and the recipe being used. Those skilled in the art will understand that, while control routines and configurations are described herein for batch runs in the reactor units illustrated in FIG. 1, control routines may be used to control other desired devices to perform any other desired batch process runs or to perform continuous process runs, if so desired.

As will be understood by those skilled in the art, the same phases or steps of a batch process can be implemented on each of the different reactor units of FIG. 1 at the same or at different times. Furthermore, because the reactor units of FIG. 1 generally include the same number of and types of equipment (i.e., they belong to the same unit class), the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more of the input valves 101 or 102 for a certain amount of time, for example, until the fluid level meter 105 senses that the vessel 100 is full. However, this same control routine may be used to implement a fill phase for Reactor_02 by merely changing the designation of the input valve(s) to be the valves 201 or 202 instead of the valves 101 or 102 and by changing the designation of the fluid level meter to be the fluid level meter 205 instead of the fluid level meter 105.

In previously known systems, a generalized control routine would have been created to perform a particular phase on any of the reactor units (Reactor_01, Reactor_02 or Reactor_03) using alias names (i.e., general variables) to indicate certain, as yet unspecified, parameters such as the particular reactor unit or the particular valve(s) or sensors of a reactor unit to which an instruction of the routine was to be applied. In this manner, a generalized control routine (such as a fill routine) would have been created to be used during the filling phase of any of the reactor units of FIG. 1 and, instead of specifying a particular valve to be opened to fill a particular reactor vessel at the creation of the control routine, the generalized control routine was written to merely specify an "Input_Valve" as an alias for the actual valve to be used. For these systems, an alias resolution table would have been created for each of the reactor units to which the generalized control routine was to be applied. The alias resolution table for Reactor_01 might, for example, specify that the alias "Input_Valve" is the valve 101, while the alias resolution table for Reactor_02 might specify that the alias "Input_Valve" is the valve 201, etc.

As indicated above, in one prior art system, the generalized program using these alias names was created in a workstation and an instantiated version of this program was created for each reactor unit (or other module) using an alias resolution table for the particular reactor unit (or other module). These instantiated control routines were then downloaded into and stored in the controller and, thereafter, were used during run-time to perform the phase on the particular unit, requiring a lot of memory on the part of the controller. In another prior art system, the generalized control routine was stored in the controller and was used during run-time to perform the programed operation or phase on any of the units to which it applied. In this case, the alias names were resolved on the fly during run-time using the alias resolution table for the particular unit being controlled. In this configuration, if a change was to be made to a generalized control routine that was currently being run by the controller, the run of that routine had to be aborted to enable an new generalized control routine to be downloaded into the controller.

Furthermore, neither of these known systems enabled a single generic process control routine with alias names to be applied across multiple or different types of units or hardware systems. In fact, in these prior art systems, a control routine for a phase was limited to the use with one unit class, i.e., one specific type of hardware unit for performing one type of function within the process control network. As a result, a first generic process control routine had to be created and stored for filling reactor units while a different generic process control routine had to be created and stored for filling mixing tanks and a still different one for filling feeder tanks, resulting in the creation of many different generic control routines for performing essentially the same function on different types of hardware units.

Also, as indicated above, none of these prior art systems enabled the generic control routine to account for minor differences between the equipment associated with different modules of a particular type of unit or unit class. To the contrary, a different phase routine had to be written and used on different modules of the same unit class if these different units had slightly different hardware, such as an electrical heater in one case and a steam heater in another case. This, in turn, required the programer to use a different process control algorithm or phase class for different units of the same unit class even though these different units performed essentially the same function within the process. Still further, these prior art systems had no easy method of specifying a parameter to be identified during run-time of the process control routine and, if such a dynamic reference was allowed, there was no way to tell if the dynamic reference had a valid value before trying to execute an instruction based on this reference.

The procedure or system that uses indirect referencing in process control programs or routines as described herein addresses some of the problems in the above-described prior art systems. The system described herein enables a generic process control routine or phase control routine to be written using alias names to still be stored in the controller using minimal storage space and to be executed in a manner that enables the generic phase control routine to be changed without causing any of the currently running routines to be aborted. The system described herein also enables a phase control routine to be created for and applied to multiple different unit classes or different types of hardware and uses a phase control routine that may include verifiable and easy to use dynamic references, i.e., references bound during run-time of the phase control routine.

Figure 2:
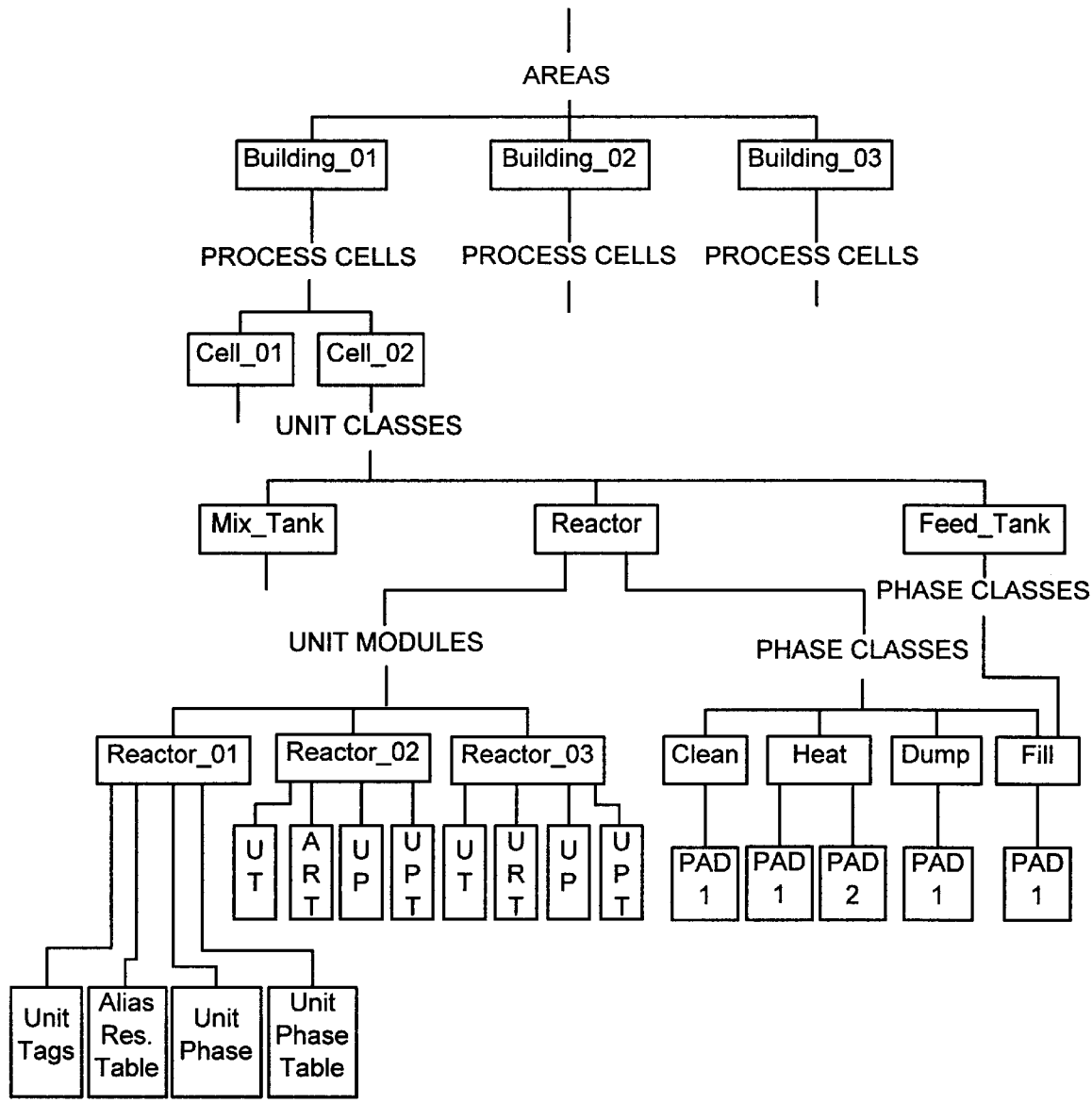
FIG. 2 is a block diagram of an object structure illustrating a conceptual configuration of the process control network of FIG. 1.

Generally speaking the manner in which the operation of the process 16 is managed by or organized within the controller 12 is based on the interaction of a number of objects, each of which has attributes and may have one or more methods associated therewith. Each object can have a number of sub-objects (or classes) associated therewith, each sub-object can have sub-objects, and so on. In a generic sense, the overall control strategy for the process 16 is configured using an object oriented programming paradigm, which is known in the art and so will not be described in further detail herein. FIG. 2 depicts an example object hierarchy illustrating the interrelationship between a number of objects associated with the process control network 10 of FIG. 1. This hierarchy will be used to explain the manner in which a process control routine is created on, for example, one of the workstations 14 and is then downloaded and executed within the controller 12 and for identifying the context in which this process control routine operates. It will be understood, however, that the manner in which process control routines are created and stored in the controller 12 may be based on other object hierarchies, or on object hierarchies having any other desired elements or objects therein.

The object tree of FIG. 2 illustrates specific objects with boxes while general categories of objects (or object types) are indicated above the objects in the tree with no box. As illustrated in FIG. 2, the process control network 10 includes one or more areas which may be, for example, buildings or other geographical area designations within a plant. In the object tree of FIG. 2, the process 16 has three area objects named Building__01, Building__02 and Building__03. Each area object may be divided into process cells, each of which identifies a different aspect of the process being performed in the area. The Building__01 area object of FIG. 2 is illustrated as including two process cell objects designated Cell__01 and Cell__02. Cell__01 may, for example, be related to making a component of a product used in Cell__02. Each cell object may include zero or more unit classes, which identify different categories or groupings of hardware used in the process cell. Generally speaking, a unit class is a named object that holds a common configuration of a set of replicated equipment and, more particularly, is a collection of units that have very similar, if not identical, process instrumentation, each of which performs a very similar, if not identical, function within a process. Unit class objects are typically named to describe the types of units within the process control system to which they belong. FIG. 2 includes a Mix__Tank unit class, a Reactor unit class and a Feed__Tank unit class. Of course, in most process control networks, many other types of unit classes will be provided or defined as well including, for example, dryer units, feedheader units, and other individual or logical groupings of hardware.

As illustrated for the Reactor unit class of FIG. 2, each unit class object may have unit module objects and phase class objects associated therewith. Unit module objects generally specify certain instances of replicated hardware within the named unit class while phase classes generally specify the phases that can be applied to the unit modules associated with the unit class. More particularly, a unit module object is a named object that holds all of the variables and unit phases (defined hereinafter) for a single process unit and is typically named to identify specific process equipment. For example, the Reactor unit class of FIG. 2 has Reactor__01, Reactor__02 and Reactor__03 unit modules which correspond to Reactor__01, Reactor__02 and Reactor__03 illustrated in FIG. 1, respectively. The Mix__Tank unit class and the Feed__Tank unit class will similarly have particular unit modules corresponding to particular hardware or equipment within the process 16. However, for the sake of simplicity, none of the equipment associated with the Mix__Tank or the Feed__Tank unit classes is illustrated in FIG. 1.

A phase class is a named object that holds the common configuration for a phase that can run on the multiple units belonging to the same unit class and, according to the present invention, on multiple different unit classes. In essence, each phase class is a different control routine (or phase) that is created and is used by the controller 12 to control unit modules within the same or different unit classes. Typically, each phase class is named in accordance with the verb that describes an action performed on a unit module. For example, as illustrated in FIG. 2, the Reactor unit class has a Fill phase class which is used to fill any one of the reactor vessels 100, 200 or 300 of FIG. 1, a Heat phase class which is used to heat any one of the reactor vessels 100, 200 or 300 of FIG. 1, a Dump phase class which is used to empty any one of the reactor vessels 100, 200 or 300 of FIG. 1, and a Clean phase class which is used to clean any one of the reactor vessels 100, 200 or 300 of FIG. 1. Of course there can be any other phase classes associated with this or any other unit class. It will be noted that the Fill phase class is associated with both the Reactor unit class and the Feed_Tank unit class and so, according to the present invention, can be used to perform fill functions on Reactor unit modules as well as Feed_Tank unit modules.

A phase class may generally be thought of as a subroutine to be called by the batch executive routine to perform some function needed in an overall batch process, as defined by the recipe for that batch process. A phase class may include zero or more phase input parameters, which are basically the inputs provided to the phase class subroutine from the batch executive routine or another phase class, zero or more phase output parameters which are basically the outputs of the phase class subroutine passed back to the batch executive routine or to another phase class, zero or more phase messages, which may be messages to be displayed to the user regarding the operation of the phase class, information related to other phase classes with which this phase class is associated in some manner, and zero or more phase algorithm parameters which cause parameters to be created in phase logic modules (PLMs) or unit phases based on this phase class. These phase algorithm parameters are used as temporary storage locations or variables during the execution of the phase and are not necessarily visible to the user or to the batch executive routine. Importantly, the phase class includes one or more phase algorithm definitions (PADs) which, generally speaking, are the control routines used to implement the phase. Also, the phase class has a list of associations to zero, one, two or more unit classes, and this list defines the unit classes for which this phase class and, consequently, the PAD of the phase class, can be applied. The Fill phase class list of associations would include both the Reactor unit class and the Feed_Tank unit class.

The PAD is an unnamed object that holds the abstract or generic phase logic (algorithm) for a phase class and may be configured using any desired type of programming structure, such as any implicit phase logic state machine, sequential flow chart (SFC) composites, function block composites or any other desired control programming logic to be used by the controller 12 to control operation of the process 16. In one embodiment, PADs are defined using SFC programming techniques, in which a number of steps are tied together and the actions within one step are executed until a transition condition becomes true, at which point the control moves onto the next step which is performed until the next transition state condition becomes true, and so on. The SFC programming protocol is based on the IEC 848 and the IEC 1131-3 standards for programing languages and is well known in the art. However, the PADs may use any other desired type of programming structure to define the operation of a phase. Generally speaking, the PAD provides the base or generic control routine to be executed by the controller 12 during operation of a batch process.

To enable a generic PAD to be applied to any number of different unit modules within a unit class, the PAD is configured (by the user using a configuration application in the workstation 14) to reference any external module or I/O that varies from unit module to unit module, as well as any other desired variables or parameters, using an alias name, i.e., a generic or as yet unspecified name in that it is not yet tied to any particular hardware or hardware element. As a result, the PAD is generic in the sense that the PAD can be applied to or used in multiple unit modules and even in multiple unit classes.

Each of the phase classes of FIG. 2 includes one PAD object, except for the Heat phase which includes two PAD objects which enables the same phase class to be applied to and used to control units (such as reactor units) having slightly different types of hardware or equipment associated therewith, as will be described in more detail below.

Referring again to the unit modules in FIG. 2, each unit module object includes zero or more unit tags (UT) or parameters having initial values. These parameters may correspond to settings and configuration parameters of the equipment associated with the unit module. Still further, each unit module object may have alarms, resource identifications, a control display (such as a human-machine interface picture), a list of the resources that this unit module requires, process cell information, etc. associated therewith. Importantly, each module unit object has an alias resolution table (ART), zero or more unit phase objects (UP) and a unit phase table (UPT) associated therewith. The alias resolution table is an unnamed object that holds a list of alias name/ instance definition pairs for the unit module to which it belongs. The list of alias names in the table is based on the valid alias names defined for the unit class, which, in turn, includes all of the alias names used in all phase classes that are associated with the unit class of this unit module. In other words, the alias resolution table of a unit module includes an alias definition for each alias used in each phase class that can be implemented on this unit module. The user configures the instance definition for alias names that should be defined on each unit at configuration time based on the alias names used in the phase classes associated with the unit class.

In some instances it is desirable to provide a special value for an alias instance definition that means to IGNORE a particular alias name. The effect of this definition to is to say that, on this unit module, phase logic that uses this alias name should be allowed to be downloaded into the controller 12 even though this unit module does not need or support that alias name. The run-time execution causes write attempts to an aliased parameter of the phase logic specified with an aliased parameter path string and having an alias instance definition of IGNORE to be suppressed, causes read attempts to an aliased parameter defined as IGNORE to be suppressed or returns a null or zero value or some other preset value and possibly causes an alarm to be generated to alert a user that a problem exists. If desired, the IGNORE definition may be stored as an attribute of the alias definition and may be tested during run-time using, for example, IF . . . THEN logic.

Each unit phase object is a named object that represents an instance of a phase class associated with or created for a particular unit module. In the configuration system (i.e., in one of the workstations 14), the unit phase object represents a component of a unit module that can be independently changed and downloaded. In the run-time system (i.e., in the controller 12), the unit phase object represents a phase logic that can be independently operated (started, stopped, held, aborted, etc.) by the controller 12 on a unit module; potentially in parallel with other unit phases simultaneously active on different unit modules. In essence, the unit phase object is the instantiated version of one of the phase classes that has been resolved using the alias resolution table for the unit module to which the unit phase object belongs. For example, one unit phase object of Reactor_02 of FIG. 1 would be created using the generic PAD for the Fill phase class, having the alias names therein resolved using the alias resolution table for the Reactor_02 module unit. Thus, the alias Input_Valve in the PAD for the Fill phase class might be defined as the valve 201 or 202 of FIG. 1 in the Fill unit phase object for the Reactor_02 unit module. The controller 12 actually executes the unit phase object (i.e., the instantiated version of the phase class during run-time), leaving the generic version of the phase class in the memory 22.

The phase table for a unit module is an unnamed object that holds key properties for every unit phase made available on the unit module. The phase table includes a list of phase class names of all phase classes that belong to the unit class of the unit module. For each phase class, the user sees/configures the key properties, including the unit phase name (string), a verify indication that there is a valid alias instance definition in the alias resolution table of the unit module for each alias name used in the phase class and that any other mandatory phase class verification checks have passed, and a download indication which enables the designer or user to suppress downloading the unit phase logic for phase classes. For example, a unit phase would not be downloaded if either the verify indication specified that verification did not occur or if the download indication was set to NO by the user. The phase table may also include a Permanent (Yes/No) identification notifying the controller 12 if this unit phase should be treated as "permanent" in the run-time system. If so, the unit phase is always instantiated so it can never fail to run because of over-commitment of controller memory resources. Other information may also be provided in the unit phase table, such as properties required by the batch executive routine, resource identifiers, resources required, an execution period divider/multiplier for the controller 12 and any other properties that would control run-time behavior of a phase.

Figure 3:
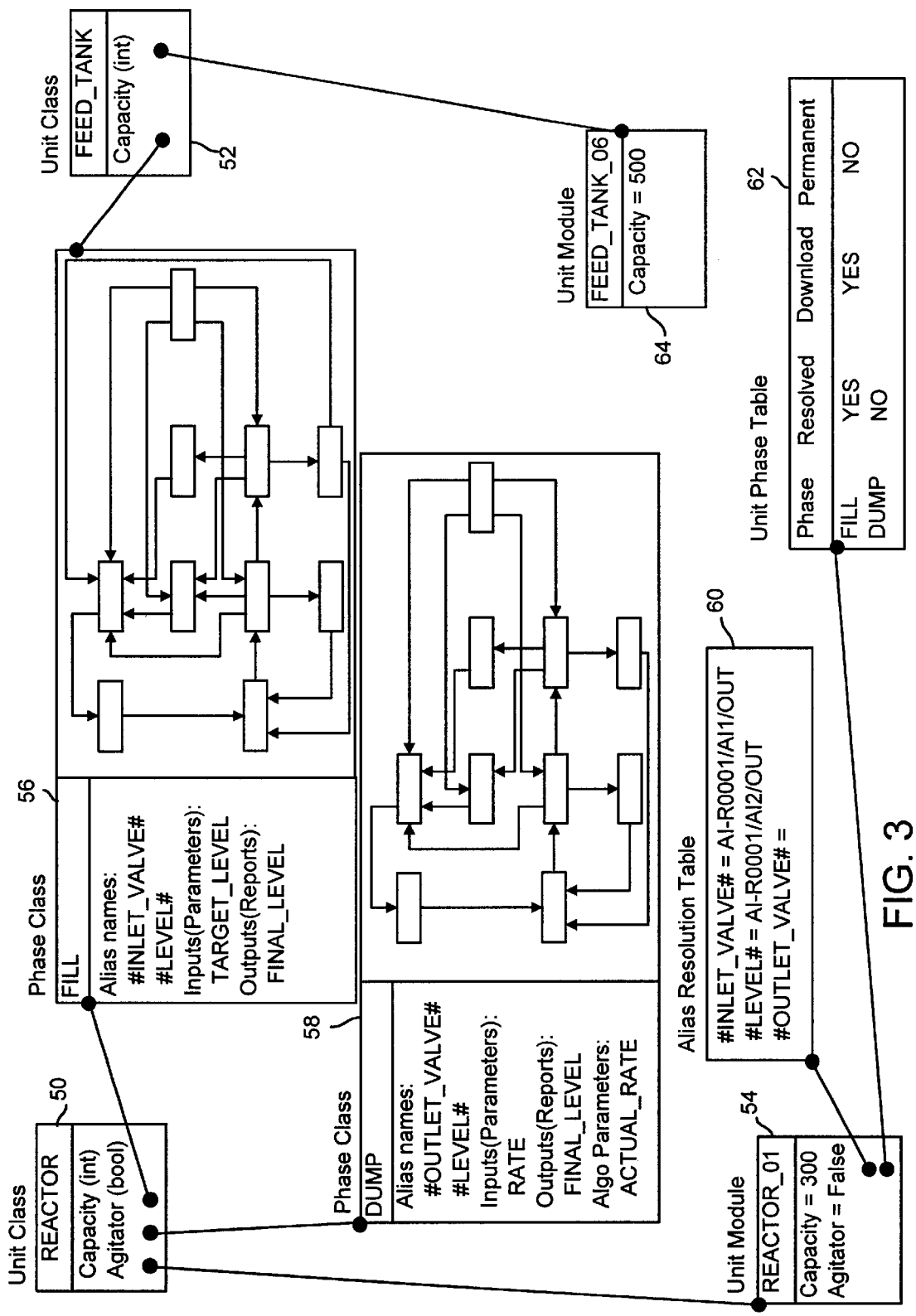
FIG. 3 is an expanded block diagram of a portion of the object structure of FIG. 2.

FIG. 3 depicts a more detailed version of some of the objects illustrated in FIG. 2 and better illustrates the interrelationships between these objects. To illustrate the principles of the present invention, two unit classes are depicted in FIG. 3, namely, a Reactor unit class 50 and a Feed_Tank unit class 52. The Reactor unit class 50 has one unit module 54 illustrated therefor, namely Reactor_01. While others may exist, they are simply not illustrated in FIG. 3. The unit module 54 defines some of the reactor parameters associated with the reactor unit class, namely, that the capacity of the Reactor_01 is 300 and that the Reactor_01 does not include an agitator. Likewise, two phase classes are associated with the reactor unit class including a Fill phase class 56 and a Dump phase class 58. The Fill phase class 56 includes a PAD (illustrated as an SFC in graphical form on the right side thereof) that has been designed using two alias names, namely, #INLET_VALVE# and #LEVEL#. These alias names are actually used in the boxes illustrated in the PAD of the Fill phase class 56 but may, alternatively, be used anywhere else within the logic of the PAD. The Fill phase class 56 also includes an input defined as TARGET_LEVEL and an output defined as FINAL_LEVEL. While the alias names are indicated as being delimited or marked by a number sign (#), any other identifier could be used to define an alias name that must be replaced upon instantiation of a phase. Similarly, the Dump phase class 58 includes a PAD, illustrated on the right hand side thereof in graphical form, having alias names of #OUTLET_VALVE# and #LEVEL#, an input defined as RATE, an output defined as FINAL_LEVEL and an algorithm parameter (used by the PAD) defined as ACTUAL_RATE, which may be used as a temporary storage location during execution of the PAD.

Because the Fill and Dump phase classes 56 and 58 are associated with the Reactor unit class 50, the Reactor_01 unit module 54 (which is also associated with the Reactor unit class 50) should be designed to support the alias names used in both of the phase classes 56 and 58 for the reason that the controller 12 may try to create instantiated versions of the phase classes 56 and 58 for the Reactor_01 unit module 54 during run-time. As a result, an alias resolution table 60 for the Reactor_01 unit module 54 is created to define each of the alias names #INLET_VALVE# (used in the Fill phase class 56), #LEVEL# (used in both the Fill phase class 56 and the Dump phase class 58) and #OUTLET_VALVE# (used in the Dump phase class 58). The alias resolution table 60 includes valid definitions for the #INLET_VALVE# and #LEVEL# aliases but does not include a valid definition of the #OUTLET_VALVE# alias. As a result, when the configuration routine run by the workstation 14 determines if each phase class is validly defined within the control scheme, it determines that a Fill unit phase object can be created for the Reactor_01 unit module 54 because each of the Fill phase class alias names are validly defined in the alias resolution table 60 for the Reactor_01 unit module 54. However, this configuration routine determines that a Dump unit phase object can not be created for the Reactor_01 unit module 54 because the alias resolution table 60 does not have a valid definition for all of the alias names used by the Dump phase class 58. As a result, a phase table 62 for the Reactor_01 unit module 54 (which is created by the configuration application in the workstation 14) indicates that the Fill phase for the Reactor_01 unit module 54 is resolved and can be downloaded to the controller 12 but that the Dump phase for the Reactor_01 unit module 54 is not resolved and, therefore, cannot be downloaded to the controller 12 due to the invalid definition of the #OUTLET_VALVE# alias in the alias resolution table 60.

It is to be noted that the Fill phase class 56 illustrated in FIG. 3 is defined generically enough to be applicable to an additional unit class, namely the Feed_Tank unit class 52, which is illustrated in FIG. 3 as having a Feed_Tank_06 unit module 64 associated therewith. As a result, for the Fill phase class to be defined or appropriately supported for downloading to the controller 12, the Feed_Tank_06 unit module (as well as all of the other unit modules of the Feed_Tank unit class 52) must have an alias resolution table that provides a definition for the aliases used by the Fill phase class 56, namely #INLET_VALVE# and #LEVEL#. When this is accomplished, the Fill phase class 56 can be used to produce unit phases for any unit module in either the Reactor unit class 50 or the Feed_Tank unit class 52.

During configuration, a system designer, such as an engineer, uses a configuration program executed on one of the workstations 14 to configure the phase classes and alias resolution tables for each of the unit modules within the process control network 10. Generally speaking, the engineer defines the PADs for each of the phase classes (such as the Fill, Heat, Dump and Clean phase classes of FIG. 2) using any desired programming language or environment, and using alias names for certain variables or modules, such as devices, module parameters, function blocks, etc. so that the PADs can be used or applied to control any of the unit modules associated with any unit class to which the phase class belongs. The configuration application may enable the engineer to import these PADs in any desired manner and may prompt the engineer to specify any necessary information, including, for example, a list of alias names used in the PADs for each phase class.

According to the present invention, the engineer may define multiple PADs for any particular phase class to account for differences in the hardware or equipment associated with different unit modules of the same (or different) unit class. Thus, for example, when creating the Heat phase class for the Reactor unit class, the engineer may provide a first PAD that heats a reactor vessel using electrical heating equipment and a second PAD that heats a reactor vessel using steam heating equipment. A different one of these PADs will be used to create the unit phase object for different unit modules. For example, if the Reactor_01 unit module has electrical heating equipment associated therewith (for example, the device 105 of FIG. 1 is an electrical heater element) and the Reactor_02 has steam heating equipment associated therewith (for example, the device 205 of FIG. 1 is a steam heating element), the first PAD of the Heat phase class will be used to create the Heat unit phase for the Reactor_01 unit module while the second PAD of the Heat phase class will be used to create the Heat unit phase for the Reactor_02 unit module. To enable the workstation 14 and the controller 12 to decide which PAD of a phase class to use when creating a particular unit phase for a phase class that has multiple PADs, each unit module that supports a phase class with multiple PADs will include an indication identifying the type of equipment that that unit module has with respect to distinction between the different PADs. This identifier may be stored in any desired manner as long as it is available to the controller 12 when the controller 12 is creating a unit phase for execution. For example, the Reactor_01 unit module will have an identification parameter set to a value specifying that this reactor has electrical heating while the Reactor_02 unit module will have the same identification parameter set to a value specifying that this reactor has steam heating. The controller 12, when creating a unit phase for a unit module, will access the identification parameter and, based on the value of the identification parameter, use the first PAD (electrical heating) or the second PAD (steam heating) when creating the unit phase.

Next, the engineer creates the alias resolution table for each unit module (such as the alias resolution table 60 of FIG. 3) and provides in each alias resolution table a definition for each of the alias names used in every one of the phase classes associated with the unit class to which the unit module belongs. For example, in the object hierarchy of FIG. 2, the engineer would provide an alias resolution table for each of the unit modules Reactor_01, Reactor_02 and Reactor_03 to include a definition for each of the alias names used in the Fill, the Heat, the Dump and the Clean phase classes. Because, as best illustrated in FIG. 3, the Fill phase class 56 is also associated with the Feed_Tank unit class 52, the engineer would need to assure that the alias resolution table for each unit module associated with the Feed_Tank unit class (such as the Feed_Tank_06 unit module 64 of FIG. 3) includes definitions for each of the alias names used in the Fill phase class 56 as well as any other phase class associated with the Feed_Tank unit class 52. Of course, as noted above, some of the alias names may be defined with the IGNORE value in some of the unit module alias resolution tables because they are irrelevant to the operation of the particular unit module.

Preferably, the configuration application within the workstation 14 includes an alias definition checking routine that automatically checks to determine if every alias name for each phase class is supported by the alias resolution table for each unit module belonging to the unit class to which the phase class belongs. In one embodiment, each unit class will provide a list of alias names that includes every alias name used in every phase class associated with the unit class. The checking routine may then determine if a valid alias definition exists for each of the these alias names in every alias resolution table associated with the unit class. Because multiple unit classes may share a phase class (as illustrated for the Fill phase class of FIGS. 2 and 3), the same alias names may be used in different unit classes, which requires alias names to be globally unique within the system. In another embodiment, the checking routine may determine the alias names for a particular phase class, determine the unit classes to which the phase class belongs based on the unit class identifier of the phase class, and check the alias resolution table for each unit module associated with the identified unit classes to determine if these alias resolution tables include a valid definition for each of the alias names of the phase class. The routine may then go on to the next phase class and repeat the procedure until all phase classes have been checked. During this process the checking routine may fill out the phase table for each unit module indicating in the phase table whether each phase is resolvable based on the alias resolution table for that unit module and whether this phase, i.e., the phase class, can be downloaded into the controller 12 for use in run-time operation. The checking routine may also determine whether a definition for each alias name exists in any particular alias resolution table and whether the specified definition is a valid one, i.e., points to a valid location or device within the process control system. This checking is accomplished using a configuration database within the workstation 14 that is set up to mirror the system hardware configuration and the database used by the controller 12 during run-time. The use of this checking routine helps enable a phase class to be supported by multiple unit classes.

The phase tables may be used by the engineer to determine which phase classes are not supported by each and every unit module to which the phase class may be applied during run-time. When a phase class is not supported by even one unit module (due to an invalid or missing alias definition in the alias resolution table for that unit module), the configuration routine preferably prevents that phase class from being downloaded into the controller 12 to prevent the controller 12 from trying to create an executable routine based on the phase class which may halt or suspend due to the unresolvable alias definition. Furthermore, the configuration routine may prevent downloading of a phase class based on the setting of the download parameter within the phase table.

When the phase classes and alias resolution tables are all configured properly, they are downloaded to the controller 12 to enable run-time operation based on these objects. Generally speaking, the controller 12 stores the alias resolution tables and the phase classes having the alias names therein within the memory 22. However, the phase classes and alias resolution tables may be stored in the memory 20 of one of the workstations 14 or in any other memory, if so desired. In any event, the controller 12 does not create an executable unit phase routine until such a routine is actually needed or called by the batch executive routine (which may be stored in and run on a workstation 14 or the controller 12). When the batch executive routine implements a batch run, it first creates an instantiation of each phase class for each of the particular unit modules on which the batch process is to be run. The controller 12 (or a program therein) accesses the phase class to be used and accesses the alias resolution table for the unit module on which the phase associated with the phase class is to be run. Using the alias resolution table and the PAD for the phase class, the controller 12 creates an executable unit phase wherein the alias names within the PAD are resolved or are replaced by the definitions for these names within the alias resolution table. If the phase class has more than one PAD, the controller 12 uses the PAD identification parameter of the unit module to determine which PAD to use to create the unit phase. Thereafter the controller 12 executes the unit phase (i.e., the instantiated version of the phase class) as directed by the batch executive routine.

Because, the controller 12 stores the phase class (having the alias names therein) in the memory 22 thereof, the controller 12 does not need to have an instantiated executable version of each phase class for each unit module (i.e., all of the unit phases) at all times, which reduces the memory requirements of the controller 12. In fact, according to the present invention, the controller 12 needs only use enough memory to store each of the phase classes and each of the instantiated unit phases that are currently running. After executing a unit phase, the controller 12 may discard the unit phase because the controller 12 can create a new unit phase for a unit module from the stored phase class and the stored alias resolution table for that unit module. Of course, if a unit phase is to be permanently instantiated for operation of the controller 12, as defined by the user in the phase table, the unit phase is not discarded but is kept in the controller memory 22 to assure that there is always memory available for this unit phase. In any event, the storing of the generic aliased control routines (phase classes) until they are actually needed and then creating an executable control routine using the alias resolution table reduces the amount of memory required over the prior art systems that require a controller to store a separate executable program for each phase class for each unit module at all times. However, because a separate executable control routine (unit phase) is created before run-time, the controller 12 will recognize that a resolving problem exists between the generic control routine and the alias resolution table before beginning to execute a batch run, which prevents the batch run from starting and then being aborted during the operation thereof due to an unresolvable alias name, which was a problem with the prior art system that stored and executed a generic control routine in which alias names were resolved on the fly during run-time.

Still further, because an executable unit phase is created before run-time and because it is this unit phase that is used by the controller 12 during run-time, the generic phase class is always available and, thus, this phase class can be used to create other unit phases while one unit phase created therefrom is running. Likewise, the generic phase class can be upgraded or changed while a unit phase developed from that phase class is running, which means that the user can download a new phase class without causing any currently executing routines developed from the previous phase class to be aborted. This is beneficial because it enables upgrading of the controller 12 without an interruption in the processes currently running.

Moreover, because a phase class can be associated with more than one unit class, a single phase class can be stored and used for multiple different types of units or hardware, which further reduces the number of objects needed within the control system and reduces the memory requirements of the controller 12. Also, because a phase class can have multiple PADs which can be used with different equipment within the same (or different) unit classes, the user does not have to program the batch executive routine to account for the minor differences in hardware. Instead, the phase class accounts for this difference and, thus, the batch executive routine can call or use the same phase class to perform the same function on different unit modules, even though the different unit modules have slightly different hardware associated therewith.

The process control routines developed by the engineer may also include certain parameters or variables, the value of which can be specified after the instantiated process control routine (i.e., the unit phase) is created within the controller 12. These dynamically bound or dynamically resolved parameters are useful when, for example, there are different choices available to a user or to the batch executive routine within a phase of a batch run on a particular unit module. For example, a batch executive routine may need to decide whether to open valve 201 or the valve 202 in the Reactor_02 of FIG. 1 depending on the recipe being used. If, for example, the batch run is making a carbonated beverage such as beer, the recipe may be for making regular beer, in which case the valve 201 of the Reactor_02 may need to be opened during the Fill phase of the batch process, or the recipe may be for making light beer, in which case the valve 202 of Reactor_02 may need to be opened during the Fill phase of the batch process. Instead of having two separate phase classes for these different fill operations (based on the recipe), it is useful to enable the batch executive to specify the input valve parameter dynamically after the unit phase for the Reactor_02 unit module has been created within the controller 12.

As indicated above, prior art systems that enabled dynamic binding typically used an address array in which different pointers could be stored at different addresses used within the control routine, wherein there was one pointer associated with each address. However, it was difficult to keep track of these addresses and the pointers therein and there was no way to determine dynamically if the pointer at an address was valid before trying to make the dynamic connection. If the pointer was invalid, the control routine would typically suspend, which was very undesirable especially during the middle of a batch run, as this suspension generally resulted in the loss of production time and materials and potentially required very difficult operator intervention to get the batch run back on track.

According to the present invention, it is preferable to enable a dynamically bound (dynamically specified) variable or parameter (a dynamic reference parameter) to be used in the process control routine for any phase class. In other words, in some cases, it is preferable to place a dynamic reference parameter in the PAD of a phase class, with this dynamic reference parameter being transferred or carried over to the unit phase when the executable unit phase is created from the phase class, and wherein the value of this dynamic reference parameter is capable of being specified after the unit phase is created and even after the unit phase has begun to execute (i.e., during run-time). As noted above, this parameter is useful when, for example, the selection decision as to the value of the parameter is based on information that is not available at configuration time, for example a selection based on an operator entry, a selection based on a recipe parameter passed from the batch executive routine, a selection based on run-time values of control variables, etc.

The dynamic reference parameter for use in the process control routine may be defined using conventions used to define other hardware or software parameters within the process control system except that the dynamic reference parameter is located in the memory 22 of the controller 12 (or some other memory if so desired). The dynamic reference parameter preferably includes multiple attributes or fields to enable different operations to be performed using the dynamic reference parameter. In particular, the dynamic reference parameter may include the fields or attributes defined in the table below.

| Name | Type | Configurable | Readable | Writable |
|------|------|------|----------|----------|
| DREF | String | No | Reading as a string will return the current reference path with any alias names resolved if possible. Not readable as a floating point, integer, etc. | Writing as a string establishes a new reference path; ideally causing a new external reference to be connected. Not writable as a floating point, integer, etc. |
| CONN | Integer | No | Defines the connection status of the reference in the DREF field. Read as an integer: 0 means reference has been established; −1 means reference is never going to work; >0 means connection in progress, worth checking again later. | No |
| DRFV | Float | No | The value of the referenced field interpreted as a floating point value. Used in numeric expressions. If the referenced field cannot be interpreted as a floating point value (say it is a string type field), the value read is MAX_value. The value is also read as MAX_value if the CONN attribute is not equal to 0. | Writing to this attribute causes the value of the referenced field to be written as a floating point value asynchronously. Used in numeric expressions. If the referenced field cannot be interpreted as a floating point value (say it is a string type field), the write operation will fail. No write attempted if the CONN attribute is not equal to 0. |
| DRSV | String | No | The value of the referenced field interpreted as a string. Used in string expressions. If the referenced field is numeric, the numeric value is converted to string form (if possible). Empty string is returned if the CONN attribute is not equal to 0. | Writing to this attribute this causes the value of the referenced field to be written as a string asynchronously. Used in string expressions. If the referenced field is numeric, the string is converted to the numeric form (if possible) and written. No write is attempted if the CONN attribute is not equal to 0. |
| DRST | Integer | No | Reads the value of the status field of the referenced parameter (if any). Use this attribute to copy the status value from the dynamically referenced field to a local parameter status field for use in subsequent status sensitive calculations. Set to MAX_value if CONN attribute not equal to 0; | No |

-continued

| Name | Type | Configurable | Readable | Writable |
|------|------|------|----------|----------|
| | | | Set to the "good" status value if the dynamically referenced has no status field. | |
| WRST | Integer | No | Reads status value of referenced field indicating success of the last write operation to the dynamically referenced field. Values could be any that, for example, distinguish: "in progress", "success", "comm failed", "bad", etc. This attribute is reset to a "bad" value when a new reference string is written to the DREF attribute. | No |

The value of the DREF (dynamic reference) attribute is of the pointer, tag or path to the parameter or field with which the dynamic reference is currently associated. In the Delta V system, this pointer is a string value (such as a path) pointing to a module, such as a device or a module parameter. For example, a dynamic reference parameter of "OUTLET_POS" could be assigned a string constant to be a reference to a parameter/field using, for example, the instruction
  'OUTLET_POS.DREF':="VLV1004/AO/OUT.CV"; or
  'OUTLET_POS.DREF':=""; // empty string constant.

Of course, in other systems, the value of the DREF field can be numerical or string depending on the manner in which the system specifies equipment, modules, etc. Generally speaking, using a DREF assignment creates a new dynamic reference parameter in the controller 12 because dynamic references are established by assigning a full parameter reference path string to the DREF field of a dynamic reference parameter. When dynamic targeting of control operations is required, the user will need to create a dynamic reference parameter for each parameter which cannot be determined until run-time. A dynamic reference parameter can be created in any context that any other external reference parameter is created in the system including, for example, as a unit tag class, as part of a unit class, as a phase algorithm parameter in a phase class and as a module level parameter in a phase logic module. Of course the dynamic reference parameter may be used in other contexts as well. As with other user created parameters, the user configures the name for dynamic reference parameter in a manner that passes parameter name configuration rules and that is unique in the local name scope (i.e., it cannot have the same name as other parameters, blocks, or phase class names defined at the same level). Writing a string to the DREF attribute is likely to be an "expensive" operation (destroying any previous external reference objects, binding to a new external parameter) and so should generally only be done in non-repeating (pulse) expressions. Writing a new string to the DREF attribute should immediately cause the values read from CONN attribute (and the other attributes of the dynamic reference parameter) to go "bad" (unless the connection is immediately established) so that a subsequent expression testing the value of these fields will work reliably.

The string assignment to the DREF attribute can be accomplished using any desired string operations including, for example, a concatenation operation (a concatenation of two or more strings), a select string operation (in which one of a number of possible strings is selected based on the value of an operand) or any other string operation.

The CONN (connection) attribute provides an indication of whether the value specified by the DREF attribute is a valid or resolvable field within the context of the control system. When the DREF attribute is changed or set, the controller 12 immediately and automatically tests the value thereof to see if the tag or path exists therefor and can be located or resolved in the current configuration of the control system 10. If the value of the DREF attribute is valid and resolvable, the CONN attribute is set to 0. However, if the value of the DREF attribute is not resolvable and can never be resolved because, for example, it is not proper within the context of the control system or just does not exist, the CONN attribute is set to −1. If the controller 12 is actively trying to resolve the DREF attribute but has not been able to do so because of waiting times due to connection operations, etc., the value of the CONN attribute is set to be greater than 0, indicating that this value is still not resolved but may be resolved later. It is preferable, after a timing-out period, to set the CONN attribute value to −1 if the DREF attribute has still not been resolved. The CONN attribute is very useful as it enables testing of the dynamic reference during run-time. For example, a simple "IF <dynamic parameter name>.CONN=0, THEN <action to be taken>" instruction may be used to take an action only if the DREF value is validly defined. This capability enables a control routine to be written that can use the dynamic reference but that will not suspend if the dynamic reference is invalid at run-time. Of course, any other tests or instructions using the CONN attribute may be used, such as branching instructions, halting or aborting instructions, etc. Furthermore, the CONN attribute can take on any other desired values (besides 0, −1 and greater than 0) to indicate success or failure of the connection.

The DRFV (dynamic reference floating value) read/write attribute of the dynamic reference parameter is used to enable reading of and writing to the field specified by the DREF attribute as a floating point or an integer value. In one embodiment, the value of the DRFV attribute is set to a maximum value or some other specified value if the CONN attribute is not 0. Also, in this embodiment, the DRFV attribute will prevent writing to the dynamically referenced field if the CONN attribute is not 0. Likewise, the DRSV (dynamic reference string value) read/write attribute of the dynamic reference parameter is used to enable reading of and writing to the field specified by the DREF attribute as a string value. In one embodiment, the DRSV attribute is set to be an empty string if the CONN attribute is not 0 and prevents writing if the CONN attribute is not 0. These are useful attributes as they enable writing to and reading from the dynamically referenced field as either or both string and numerical fields, taking into account whether the dynamically referenced field actually exists or is valid. Of course, the DRFV or DRSV or other specifically created attributes could be used to read and/or write boolean values or array values (such as a group of values stored in an array) to the field specified by the DREF attribute.

The DRST (dynamic reference status) attribute enables reading of the status attribute associated with the field specified by the DREF attribute. In certain controller or communication protocols, such as the Delta V and the Fieldbus protocols, some parameters or fields include a value and a status indicating the state of the value, such as whether the value is good, bad, uncertain, etc. The DRST attribute enables access to this status value for a dynamically referenced parameter. The WRST (write status) attribute reads the write status value of the field designated by the DREF attribute. This status indicates the success of the last writing operation to the field designated by the DREF attribute and provides access to the write status of the dynamically reference field.

Of course, if desired, other attributes could be provided with the dynamic reference parameter to enable other operations, such as reading or writing to the mode, limit or other status values associated the dynamically referenced field or to perform any other reading of or writing to any attribute of the dynamically referenced field. Likewise, the attributes identified herein may take other names or values to indicate the success, failure, etc. of a connection, or of a read or write operation.

When a dynamic reference parameter is used in the context of a unit module, i.e., at the creation of a unit phase having a dynamic reference therein, strings written to DREF attribute are examined for alias names and any alias names are replaced based on the current alias resolution table for the unit module. As a result, dynamic references may be created to specify fields using alias names and these alias names are still resolved when the unit phase is created from the phase class. This enables the dynamically referenced parameter to be used more widely in process control routines even though the dynamic reference may not be resolved until run-time, or may be re-resolved during run-time based on a write to the DREF attribute of the dynamic reference parameter.

When using SFC algorithms, writing through dynamic reference parameters can be done in several ways depending on the design of the SFC. For example, the routine may just assign the desired value as a statement in a step expression (assuming that confirmation of the write operation, if required, is handled by logic in later parts of the SFC), the routine may use a Pulse/Assignment type action with confirmation to write once and pause until the WRST attribute goes to a value other than the "in progress" value, or the routine may use a Non-Stored/Assignment type action to repeatedly write the value until the transition expression detects that the value has been achieved or the step time is too long. Thus, when using SFC algorithms, it is preferable to establish and verify dynamic references through the use of Pulse/Assignment type action with a confirmation so that the action expression resolves the full dynamic reference path and assigns it to the DREF field of the appropriate dynamic reference parameter (at the module level or phase level) and so that the confirmation expression tests for the value of the CONN attribute being less than or equal to 0 (connected or is never going to connect). Alternatively, for dynamic reference parameters intended for reading, the value of the DRFV attribute could be read and checked for a reasonable value (as opposed to MAX_value) and the confirmation time-out value could be set to be a small number of seconds (for example, five seconds).

Furthermore, if several dynamic reference parameters can be established at the same point in an algorithm, it is preferable to create an action for each in the same SFC step. Then a single term in the subsequent expression of the SFC transition, like:

"'RESOLVE_STEP/PENDING_CONFIRMS.CV'=0"

could prevent the algorithm from proceeding until all the dynamic reference parameters have "stabilized" at their final state. If the algorithm has to handle missing or IGNORE alias connections, subsequent expressions could test the CONN attribute of the individual dynamic reference parameters to guide the execution of the algorithm.

Once a dynamic reference has been established (i.e., the DREF attribute has written) and the dynamic reference has verified (the CONN attribute is 0), the DRFV, the DRSV and the DRST fields can be written to set values in the referenced parameter. In continuous algorithms (such as in a continuously running FAIL_MONITOR composite block) the recommended approach to writing through a dynamic reference parameter (that has already been established) might take the form of:

IF ('OUTLET_POS.DRFV'!=<desired value>) AND
  ('OUTLET_POS.WRST'!=<in progress value>)
   THEN
    'OUTLET_POS.DRFV'=<desired value>;

which continuously tries to drive the referenced parameter to the desired value until it had been achieved in a manner that avoids writing when the last write attempt is still in progress.

It will be understood that process control routines using alias names which are resolved before run-time and indirect references, such as dynamic reference parameters, which are resolved during run-time can be used and implemented within any desired process control programming environment, and may be used in any process control system that uses any desired type of process control communication protocol and, further, may be used to perform any type of function with respect to any type of device(s) or sub-units of device(s). Process control routines using indirect referencing as described herein are preferably implemented in software stored in, for example, a controller or other process control device. However, these routines may alternatively or additionally be implemented in hardware, firmware, etc., as desired. If implemented in software, the process control routines discussed herein may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system for use in controlling a process, comprising:
   a controller;
   a memory; and
   a control routine used to control at least a portion of the process;
   wherein the control routine is stored in the memory, the controller creates an executable version of the control routine and controls the portion of the process by executing the executable version of the control routine; and
   wherein the control routine includes a dynamic reference parameter having multiple attributes including a reference attribute that holds a field value specifying a field to which the dynamic reference parameter points and that can be assigned after creation of the executable version of the control routine and wherein said field value specifies a field having multiple attributes.

2. The process control system of claim 1, wherein another of the multiple attributes is a connection attribute that provides an indication of whether the field value of the reference attribute is a valid reference.

3. A process control system for use in controlling a process, comprising:
   a controller;
   a memory; and
   a control routine used to control at least a portion of the process;
   wherein the control routine is stored in the memory, the controller creates an executable version of the control routine and controls the portion of the process by executing the executable version of the control routine;
   wherein the control routine includes a dynamic reference parameter having multiple attributes including a reference attribute that holds a field value specifying a field to which the dynamic reference parameter points and that can be assigned after creation of the executable version of the control routine and wherein another of the multiple attributes is a read/write attribute that reads from or writes to the field specified by the reference attribute.

4. The process control system of claim 3, wherein the read/write attribute reads or writes as a string value.

5. The process control system of claim 3, wherein the read/write attribute reads or writes as a numerical value.

6. The process control system of claim 3, wherein the read/write attribute reads or writes as a boolean value.

7. The process control system of claim 3, wherein the read/write attribute reads or writes as an array value.

8. The process control system of claim 3, wherein a third one of the multiple attributes is a connection attribute that provides an indication of whether the field value of the reference attribute is a valid reference.

9. A process control system for use in controlling a process, comprising:
   a controller;
   a memory; and
   a control routine used to control at least a portion of the process;
   wherein the control routine is stored in the memory, the controller creates an executable version of the control routine and controls the portion of the process by executing the executable version of the control routine;
   wherein the control routine includes a dynamic reference parameter having multiple attributes including a reference attribute that holds a field value specifying a field to which the dynamic reference parameter points and that can be assigned after creation of the executable version of the control routine and wherein another of the multiple attributes is a status attribute that reads a status associated with the field specified by the reference attribute.

10. The process control system of claim 9, wherein the status attribute reads a write status, indicating a success or a failure of a previous write to the field specified by the reference attribute.

11. The process control system of claim 9, wherein a third one of the multiple attributes is a connection attribute that provides an indication of whether the field value of the reference attribute is a valid reference.

12. A process control system for use in controlling a process, comprising:
- a controller;
- a memory; and
- a control routine used to control at least a portion of the process;
- wherein the control routine is stored in the memory, the controller creates an executable version of the control routine and controls the portion of the process by executing the executable version of the control routine;
- wherein the control routine includes a dynamic reference parameter having multiple attributes including a reference attribute that holds a field value specifying a field to which the dynamic reference parameter points and that can be assigned after creation of the executable version of the control routine and wherein a second one of the multiple attributes is a connection attribute that provides an indication of whether the field value of the reference attribute is a valid field and a third one of the multiple attributes is a read/write attribute that reads from or writes to the field specified by the reference attribute.

13. The process control system of claim 12, wherein a fourth one of the multiple attributes is a status attribute that reads a status associated with the field specified by the reference attribute.

14. The process control system of claim 12, wherein a third one of the multiple attributes is a connection attribute that provides an indication of whether the field value of the reference attribute is a valid reference.

15. A software control component for use in a process control system which has a controller that controls a process, the software control component comprising:
- a computer-readable memory; and
- a control routine stored on the computer-readable memory and adapted to be used by the controller to control at least a portion of the process;
- wherein the control routine includes a dynamic reference parameter having multiple attributes including a reference attribute that holds a field value specifying a field to which the dynamic reference parameter points and that can be assigned after creation of the executable version of the control routine and wherein said field value specifies a field having multiple attributes.

16. The software control component of claim 15, wherein another of the multiple attributes is a connection attribute that provides an indication of whether the field value of the reference attribute is a valid field.

17. A software control component for use in a process control system which has a controller that controls a process, the software control component comprising:
- a computer-readable memory; and
- a control routine stored on the computer-readable memory and adapted to be used by the controller to control at least a portion of the process;
- wherein the control routine includes a dynamic reference parameter having multiple attributes including a reference attribute that holds a field value specifying a field to which the dynamic reference parameter points and that can be assigned after creation of the executable version of the control routine and wherein another of the multiple attributes is a read/write attribute that reads from or writes to the field specified by the reference attribute.

18. The software control component of claim 17, wherein the read/write attribute reads or writes as a string value.

19. The software control component of claim 17, wherein the read/write attribute reads or writes as a numerical value.

20. The software control component of claim 17, wherein the read/write attribute reads or writes as a boolean value.

21. The software control component of claim 17, wherein the read/write attribute reads or writes as an array value.

22. The software control component of claim 17, wherein another of the multiple attributes is a connection attribute that provides an indication of whether the field value of the reference attribute is a valid field.

23. A software control component for use in a process control system which has a controller that controls a process, the software control component comprising:
- a computer-readable memory; and
- a control routine stored on the computer-readable memory and adapted to be used by the controller to control at least a portion of the process;
- wherein the control routine includes a dynamic reference parameter having multiple attributes including a reference attribute that holds a field value specifying a field to which the dynamic reference parameter points and that can be assigned after creation of the executable version of the control routine and wherein another of the multiple attributes is a status attribute that reads a status associated with the field specified by the reference attribute.

24. The software control component of claim 23, wherein the status attribute reads a write status, indicating a success or a failure of a previous write to the field specified by the reference attribute.

25. The software control component of claim 23, wherein another of the multiple attributes is a connection attribute that provides an indication of whether the field value of the reference attribute is a valid field.

26. A software control component for use in a process control system which has a controller that controls a process, the software control component comprising:
- a computer-readable memory; and
- a control routine stored on the computer-readable memory and adapted to be used by the controller to control at least a portion of the process;
- wherein the control routine includes a dynamic reference parameter having multiple attributes including a reference attribute that holds a field value specifying a field to which the dynamic reference parameter points and that can be assigned after creation of the executable version of the control routine and wherein a second one of the multiple attributes is a connection attribute that provides an indication of whether the field value of the reference attribute is a valid field and a third one of the multiple attributes is a read/write attribute that reads from or writes to the field specified by the reference attribute.

27. The software control component of claim 26, wherein a fourth one of the multiple attributes is a status attribute that reads a status associated with the field specified by the reference attribute.

28. The software control component of claim 26, wherein another of the multiple attributes is a connection attribute that provides an indication of whether the field value of the reference attribute is a valid field.

* * * * *